United States Patent [19]

Gawrilow

[11] 3,914,453

[45] Oct. 21, 1975

[54] PROCESS FOR PREPARING BAKERY PRODUCTS

[75] Inventor: Ilija Gawrilow, Strongsville, Ohio

[73] Assignee: SCM Corporation, Cleveland, Ohio

[22] Filed: Sept. 9, 1974

[21] Appl. No.: 504,258

Related U.S. Application Data

[63] Continuation-in-part of Ser. No. 257,154, May 26, 1972, abandoned.

[52] U.S. Cl. ............... 426/553; 426/572; 426/601
[51] Int. Cl.² ..................... A21D 13/08; A23G 3/00
[58] Field of Search .......... 426/155, 156, 162, 163, 426/194, 195, 345, 362, 363

[56] References Cited
UNITED STATES PATENTS

| | | | |
|---|---|---|---|
| 3,208,857 | 9/1965 | Howard et al. | 426/195 X |
| 3,350,207 | 10/1967 | Koren et al. | 426/24 |
| 3,397,996 | 8/1968 | Darragh et al. | 426/194 |
| 3,597,230 | 8/1971 | Colby et al. | 426/194 |

*Primary Examiner*—James R. Hoffman
*Attorney, Agent, or Firm*—Merton H. Douthitt; S. I. Khayat

[57] ABSTRACT

A single multi-purpose shortening can be used for producing a variety of bakery goods such as cakes, breads, icings, toppings, fillings etc., in an industrial bakery by the improvement in process which comprises maintaining a body of normally plastic shortening, emulsified with a controlled proportion of monoglycerides, polyglycerol esters, and ethoxylated sorbitan esters and having a Beta-prime fat crystal directing tendency, in the molten state, and blending the desired portion of said molten body directly with substantially all the other ingredients of the particular bakery goods, including the dry ingredients thereof, for preparation of same.

10 Claims, 1 Drawing Figure

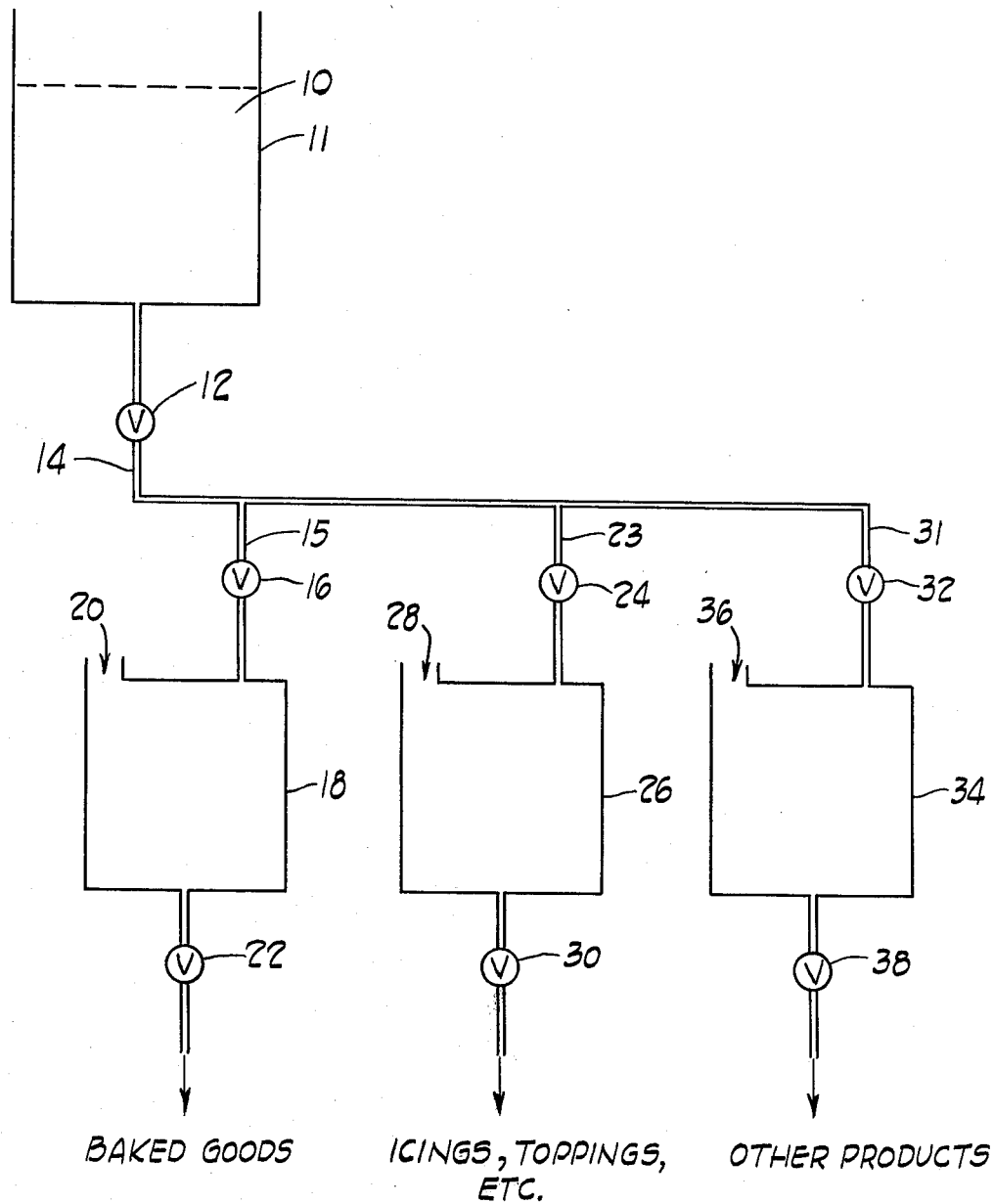

PROCESS FOR PREPARING BAKERY PRODUCTS

CROSS-REFERENCE TO RELATED APPLICATIONS

The present application is a continuation-in-part to my co-pending U.S. Pat. application Ser. No. 257,154 filed May 26, 1972, now abandoned, which is incorporated by reference herein.

BACKGROUND OF THE INVENTION

1. Field of the Invention

The present invention is concerned with the production of bakery products in commercial bakeries wherein farinacous and confectionary products, such as breads, cakes, sweet goods, icings, toppings, fillings, fondants, coatings, and the like are made. More specifically, the invention is directed to an improvement in the process for preparing such products whereby a single multi-purpose shortening is utilized with the other ingredients for the particular bakery product. These other ingredients comprise both fluent and dry materials such as water, milk, eggs, sugar, flour, salt, baking powder, flavoring agents, etc.

2. Description of the Prior Art

Often a primary reason for incorporating shortenings in a wide variety of bakery products is to assist them to entrap air or other gas bubbles in a batter (e.g., chemically leavened), or an icing, topping and the like. Desirable qualities of a finished cake, e.g., volume, grain and texture are produced conventionally by mixing the other normal cake ingredients with a normally plastic or liquid shortening to make an aerated batter in one or more stages, then baking said batter. Similarly, aeration of an icing, filler icing or topping containing a suitable plastic shortening will result in the desired volume and creaminess.

Experience has shown, however, that particular shortenings are generally fairly specific for their most advantageous use in limited bakery applications. This is most noticeable between cakes and icings; a shortening which aerates a cake batter most advantageously often will fail to produce the most satisfactory icing or topping, and vice versa. This apparent peculiarity in behavior is believed to be influenced strongly by the characteristics of the fat used and especially the polymorphic properties of its crystals. Even when emulsifying agents are added to fats to aid their function, the characteristics of the fat crystals are still significant. The trend towards having a multiplicity of specially-formulated shortening compositions of limited utility has not been favored by industrial bakeries for obvious economic reasons. It can be seen that investment in plant, equipment and labor needed to accommodate specialized shortening formulations can be costly to the commercial baker.

In the prior art, efforts to provide a convenient multi-purpose shortening were directed essentially to improving normally liquid shortenings because of their ease to handle, measure and store. These efforts, however, met with limited success as most liquid shortenings failed to produce commercially acceptable confectionary products such as icings and fillings.

Advantages of the instant invention over prior proposals include the highly efficient use of a multi-purpose shortening for making a wide variety of bakery goods and components, while obtaining desired volume, grain, texture, body, eating quality or other qualities and combination of qualities in each particular sort of such goods.

SUMMARY OF THE INVENTION

In accordance with the present invention a minor proportion of a molten, normally plastic shortening is blended with a major proportion of other comestible ingredients including dry ingredients to produce various bakery products.

Broadly, the shortening composition comprises (a) from about 77 to 94% by weight, basis the composition, of an edible triglyceride fat derived from fatty acids containing 12–22 carbon atoms and characterized by having a Wiley melting range of about 90° to 140°F. and having the ability to form, on cooling, stable crystalline bodies preponderantly of the Beta-prime phase configuration, (b) from 1.5 to 8% by weight, of edible monoglycerides; (c) from 2.0 to 8%, by weight, of edible polyglycerol esters; (d) from 0.5 to 2%, by weight, of a member selected from the group consisting of edible ethoxylated sorbitan esters and edible ethoxylated monoglycerides; (e) from 0 to 3%, by weight, of edible diglycerides; and (f) from 0 to 2% by weight, of an edible phospholipid; and wherein the fatty acid component in said monoglycerides and diglycerides, polyglycerol and ethoxylated sorbitan esters, and ethoxylated monoglycerides contains 16–22 carbon atoms.

DETAILED DESCRIPTION OF THE INVENTION

The Drawing:

The accompanying drawing is a flow diagram showing the manner by which this invention can be practiced.

Shortening 10 of this invention is maintained in a completely molten condition in reservoir 11, the temperature of the shortening being high enough to keep substantially all lipoidal materials therein in the liquid state, but not substantially above about 160°F. whereby heat would be wasted and degradation possibly induced. Reservoir 11 is equipped suitably with heating means such as a heating coil and/or jacket (not shown) and an agitator (not shown).

On demand, molten shortening 10 flows by gravity or is impelled by pump (not shown) through valve 12 and header 14 to the various locations of an industrial bakery where the shortening is needed. For example, through line 15 and valve 16 the molten shortening is introduced into mixer 18 to which is added also the other ingredients for a batter or dough to make a baked product such as a cake, bread, a sweet roll or the like. The other ingredients can be of the dry variety such as flour, baking powder, milk solids, dry eggs, salt, etc., as well as the liquid variety such as fresh eggs, milk, water, etc., Also, commercially available preblended dry formulations can be used to make a basic mix for such goods. These ingredients are added to mixer 18 through opening 20. The addition of the dry and/or liquid ingredients is made prior to, simultaneous with, or subsequently to the molten shortening addition as is necessary or desirable. Mixer 18 can be heated or cooled conventionally, if desired. When the batter or dough has been thus prepared it is dispensed through valve 22 for conventional panning, forming, proofing, if necessary, and baking to provide the finished baked product.

Similarly, on demand, molten shortening 10 can be introduced through line 23 and valve 24 to mixing tank 26 which is adapted to receive through opening 28 the other ingredients for making confectionary products such as icings and toppings. These other ingredients are generally powdered sugar, non-fat milk solids (NFMS), salt, flavoring agents and water. Typically, the dry ingredients are first blended to form a dry mix. If desired, this dry blending can be effected in a tank or mixer other than mixing tank 26. Molten shortening 10 is now introduced and is blended with the dry mix until a continuous smooth mass is formed. Cold water (40°F.) to chill the fat content of the shortening is added to the mass, followed by blending and mixing with occasional water additions until a fluent mixture is obtained. Further treatment of this fluent confectionary mixture depends generally on its intended use. In the case of some types of icings, the fluent mixture can be subjected to additional mixing to attain the desired specific gravity and then dispensed through valve 30 for direct use. However, for certain uses and applications having specific qualities, the fluent mixture is subjected to additional treatment involving further aeration and intimate mixing. Thus, tank 26 through valve 30 can be connected to other processing units (not shown). These units comprise air or nitrogen gas injection means and/or scraped wall heat exchangers such as a "Votator" (a trademark of Chemetron Corporation, Chicago, Illinois) which may have one stage (A unit) and additional stages (B and C units). Heat exchange units ("Votators") have been well described in the art and are well known to food processors and chemists not to require further description.

The aerated and chilled confectionary mixture emerging out of the heat exchange unit is ready for use on a variety of bakery products. Occasionally, to satisfy some particular requirements or properties of a finished bakery product, the votated confectionary mixture may have to be subjected to additional aeration. To maintain uniformity and consistency the confectionary mixture is also mixed under high shear. The aeration high shear mixing can be done simultaneously for which purpose a suitable mechanical device is utilized. Briefly, a typical mechanical device such as an "Oakes Continuous Automatic Mixer" (a trademark of the E. T. Oakes Corporation, Islip, Long Island, New York) comprises, in part, an enclosed chamber equipped with two parallel plates which rotate in a counter motion to each other and each of which is equipped with circular rows of perpendicular projections so arranged that during rotation of the plates the fluent confectionary mixture is fed and squeezed between these projections thereby subjecting it to a high shear mixing action. The chamber is also connected to a source of compressed air or nitrogen gas which is bled into the chamber during the mixing action. The emerging confectionary product, which is generally of low specific gravity, is ready for use.

Depending upon the extent of the industrial operation and product line of the particular bakery, it can be seen that header 14 can serve a plurality of mixing or blending tanks. Thus, line 31 through valve 32 can provided molten shortening 10 to tank 34 for any other suitable use. Molten shortening 10 can be rendered plastic without affecting its functionality as a superior shortening for icings and fillings.

The edible triglyceride fats suitable for formulating the shortening composition described above can be derived from animals, vegetables or nuts. Tallow and rearranged lard have been used alone or in combination with hydrogenated vegetable oils such as hydrogenated cottonseed oil, soybean oil, palm oil, corn oil, rapeseed oil, sunflower seed oil, sesame oil, safflower oil and the like. Of late, the tendency has been to prepare the shortening compositions entirely from vegetable stocks. Thus, for many applications it is preferable to utilize vegetable oil such as, for example, hydrogenated palm oil (I.V. 45) together with hydrogenated soybean oil (I.V. 103) with and the foregoing emulsifiers of mono- and diglycerides, triglycerol esters, and ethoxylated sorbitan esters. Oils deriived from nuts such as hydrogenated peanut oil and hydrogenated hazelnut oil can also be used.

The triglyceride fats comprising the base stock of the shortening are composed of $C_{12-22}$ fatty acids. The Wiley melting point of the useful triglyceride fats is generally in the range 90°–140°F., and the crystals therefrom should be preponderantly stable beta-prime crystalline bodies. Beta-prime crystals are identified easily by their X-ray diffraction patterns.

The presence of the monoglycerides, polyglycerol esters and either ethoxylated sorbitan esters or ethoxylated monoglycerides in the shortening composition is believed to be necessary for carrying out the process of the present invention. The upper limits of 8% by weight for the monoglycerides, 8% by weight for the polyglycerol esters and 2% by weight for either the ethoxylated sorbitan esters of ethoxylated monoglycerides are dictated more by economics than by criticality. The lower limits of 2, 2 and 0.5% by weight, respectively, are believed to be essential, however. There appears to be a distinct synergistic effect between the above additives and the triglyceride fat comprising the major portion of the shortening composition. This synergistic effect is believed to become evident when the above-mentioned additives are at least at their low limits which provide the shortening composition with adequate functionality (air-entrapping ability) and sufficient stability for use in accordance with the process of the invention.

As to the diglycerides and phospholipids, it has been found that their presence is optional and by no means critical either to the shortening composition or to the process of the invention. From a practical point, it is generally not necessary to add any diglycerides since they are present in many commercially available monoglycerides. The addition, however, of lecithin as a representative phospholipid may be desirable to enhance the functional properties of the monoglycerides and the other emulsifiers. Also, lecithin tends to reduce the viscosity of the shortening composition, which is useful, particularly in the preparation of icings and confectionary products.

The polyglycerol esters and the ethoxylated sorbitan esters or ethoxylated monoglycerides provide additional emulsifying action to enhance the application of the shortening compositions. The polyglycerol esters can be prepared from glycerine and fatty acids having 16–22 carbon atoms. Preferred polyglycerol esters include the commercially available ones generally referred to as diglycerol monostearate, triglycerol monostearate and hexaglycerol distearate. The ethoxylated sorbitan esters referred to herein are those having fatty acids containing 16–22 carbon atoms and which contain 5 to 80 ethoxy moieties per molecule. Commercially available polyoxyethylene (20) sorbitan monostearate which has an average of about 20 ethoxy moieties is preferred for economy and efficiency.

Ethoxylated monoglycerides can be substituted for the ethoxylated sorbitan esters without any noticeable effect on the functionality of the shortening. These compounds are prepared under relatively high temperatures and pressures from monoglycerides and ethylene oxide utilizing a strong base such as potassium hydroxide as a catalyst. Generally, ethylene oxide content of 25 to 80% by weight of the ethoxylated product is useful with an optimal range of 45–75%, by weight. Adducts containing an average of 20 ethoxy moieties, e.g., 60–68% by weight, are preferred because of commercial availability, efficiency and acceptance in the baking trade.

The acyl radicals of the mono- and diglycerides are predominantly composed of carbon chains having 16 to 22 carbon atoms which can be saturated or unsaturated. Typical radicals are palmitoyl, palmitoleoyl, stearoyl, oleoyl, linoleoyl, linolenoyl, arachidoyl and arachidonoyl.

It is well known that fat crystals exist in several polymorphic forms all of which have been well described in the art. Briefly, these polymorphic forms represent separate and distinct crystalline phases which are designated as alpha, beta-prime, intermediate and beta with the alpha phase being the least stable. The presence of fat crystals in one or more crystalline phases together with the rate of transformation from one modification to another indicates, by and large, the effectiveness of the fat under consideration as a suitable shortening component.

As stated hereinbefore, the primary function of most shortening compositions is to enable baked goods, batters, and confectionary mixes to entrap or incorporate air or gas bubbles. Studies based on X-ray diffractions and microphotography have shown that fat crystals in the beta-prime phase are best suited for this aeration ability, particularly in icings. Because of their lattice structure and minute size, e.g., about one micron, beta-prime phase crystals are able to incorporate a large number of very small air or gas bubbles which are believed responsible for producing the desirable physical properties of finished bakery products such as volume, texture, grain, etc. By comparison, alphaphase crystals are generally unstable and too loosely arranged to assist much in aeration; and crystals in the intermediate and beta phases which represent relatively more stable forms, are closely packed but rather large in size, e.g., 20–50 microns, and, consequently, entrap fairly large air bubbles compared to those entrapped by beta-prime.

As indicated earlier, the triglyceride fats comprising the substantial portion of the shortening composition are directed to those which form, on cooling from the molten state, a preponderance of stable beta-prime or beta-prime tending crystals. Many fats form at some cooling stage a preponderance of beta-priming crystals. But, as cooling continues, so does the rate of transformation to more stable forms, e.g., intermediate and beta. Both the pattern of morphological behavior and its rate of transformation are related to the ease with which the triglyceride molecules can orient to each other to form closely-packed crystal lattices. Thus, triglyceride molecules containing identical glyceride components are found in highly hydrogenated fats, are able to fit closely together and their crystals transform rapidly to the beta form. However, if the fat molecules are made up of assorted variety of glyceride components, it becomes relatively more difficult for them to pack closely resulting in a stable lower form such as beta-prime and a slow rate of transformation. Fats described earlier such as rearranged lard, tallow, hydrogenated cottonseed oil, hydrogenated palm oil, hydrogenated soybean oil, and other hydrogenated oils of vegetables and nut origins are necessary for the shortening composition in accordance with the invention. These triglycerides consist generally of random assortments of triglyceride components and, consequently, have the tendency to form upon cooling a preponderance of stable beta-prime crystals.

The following examples illustrate the process of the present invention and the advantages derived from utilizing a multipurpose shortening for various bakery goods.

EXAMPLE I

A shortening composition capable of functioning in both the plastic and molten states was prepared from the following ingredients in the percentages indicated:

| Ingredients | Percentages by Weight |
| --- | --- |
| Tallow | 65.6 |
| Cottonseed Oil | 21.9 |
| Monoglycerides & diglycerides (a) | 6.2 |
| Triglycerol monostearate | 4.0 |
| Polyoxyethylene (20) sorbitan monostearate | 1.3 |
| Lecithin | 1.0 |

(a) The mono- and diglycerides used above are common commercial products derived from hydrogenated vegetable oils. They contain small amounts of citric acid, butylated hydroxyanisole (BHA) and butylated hydroxytoluene (BHT) as preservatives and antioxidants. The composition of both these partial glycerides should comprise a minimum of 40% monoglycerides with other properties being an iodine value (I.V.) in the range of 70–80 and a capillary melting point (CMP) in the range of 110°–120°F.

The above composition was rendered molten by heating it to about 125°F. in a suitable reservoir which is equipped with a mechanical stirrer or agitator to help provide a uniform shortening composition. The reservoir is connected conveniently to a network of pipes and valves to facilitate the movement and transfer of said molten shortening.

Filler Icing Preparation

A typical filler icing (0.40–0.65 specific gravity) was prepared from the above described shortening and other ingredients. The composition is as follows:

| Ingredient | Weight (Grams) | percent |
| --- | --- | --- |
| 6X Powdered Sugar | 1080 | 54.0 |
| Non-Fat Milk Solids (NFMS) | 66 | 3.3 |
| Shortening (molten) | 540 | 27.0 |
| Water | 300 | 15.0 |
| Vanilla | 10 | 0.5 |
| Salt | 4 | 0.2 |

The dry ingredients were first dry blended in a bowl, using an electric mixer. The shortening was then introduced into the bowl with continued mixing at low speed until the entire amount was added, after which the mixing speed was increased to medium until the bowl contents formed a continuous and smooth mass. Ice water (40°F.) was then added to the bowl and mixing was resumed with occasional scraping until the desired specific gravity of the filler icing was obtained (3 minutes for 0.55 specific gravity)

The over-all quality of the filler icing prepared above was excellent. Specifically, it had good body and firm texture as well as being stable showing neither coalescence nor syneresis. These characteristics are usually expected of filler icings utilizing specialized shortenings. This was shown by preparing another batch of the filler icing utilizing the same ingredients with a commercial, normally plastic shortening designed to produce high moisture-type cream icings and filler icings. The results were comparable with no noticeable difference. In this connection, the commercial plastic shortening used comprised hydrogenated vegetable oil, mono- and diglycerides and polyoxyethylene (20) sorbitan monostearate. It had the following properties: Color 2.5R (maximum), monoglycerides 2.6–3.1% and Wiley melting point in the range of 105°–110°F.

The aforementioned filler icing can be prepared in the same manner from a shortening composition containing the same ingredients as described except for the ethoxylated sorbitan ester which can be substituted with a comparable amount of an ethoxylated monoglyceride such as polyoxyethylene (20) monostearate. Likewise, the base stock of tallow and hydrogenated cottonseed oil can be substituted with other suitable triglycerides, as indicated.

The commercial, normally plastic shortening referred to above produced an unacceptable filler icing when utilized in the molten state; the icing was characterized by being unstable and wet. It also developed air cell coalescence.

Other commercial plastic and liquid shortenings comprising animal fats and/or vegetable oils were utilized, particularly those normally plastic ones recommended for preparing icings. Thus a shortening comprising animal and vegetable fats, about 3% monoglycerides (minimum), and having a Wiley Melting Point (WMP) of 116°–122°F. as well as BHA and BHT as antioxidants, produced acceptable icings only when mixed in the plastic state. In the molten state, however, the resulting icing was invariably unstable, wet, and developed air cell coalescence. Even when this icing composition was passed through an aeration step combined with a scraped-surface heat exchanger (Votator), no improvements were observed.

EXAMPLE II

In a suitable mixer bowl the following ingredients were placed and mixed for 5 minutes with an electric mixer utilizing medium speed. The shortening according to the invention, was utilized in both the molten (125°F.) and plastic (room temperature) states:

| Ingredient | % (flour basis) | Weight (grams) |
|---|---|---|
| Granulated sugar | 110.06 | 788 |
| Cake flour | 100.00 | 716 |
| Shortening | 21.65 | 155 |
| Corn syrup | 14.53 | 104 |
| Dark cocoa | 20.11 | 144 |
| Baking powder | 6.01 | 43 |
| Salt | 2.51 | 18 |
| NFMS | 12.15 | 87 |
| Vanilla | 0.84 | 6 |
| Water | 87.99 | 630 |

To the intimately mixed ingredients described herein an additional amount of water, 310 grams (43.3% basis flour) was added and the entire bowl contents were mixed thoroughly for three additional minutes.

The cakes baked from the aforementioned formulation were shown to have excellent properties such as good texture with consistent and uniform grain in addition to improved volume. These same qualities are obtained for cakes prepared from the same ingredients except that the shortening contains ethoxylated monoglycerides for the ethoxylated sorbitan esters.

Cakes produced from the same ingredients but with known commercial liquid and plastic shortenings showed less grain uniformity and lower volume, particularly when the normally plastic shortening was used in the molten state.

EXAMPLE III

Preparation of Pound Cakes

The following ingredients including the shortening composition described hereinbefore, were mixed for two minutes at medium speed in a "C-100 Hobart" (a trademark of the Hobart Company, Troy, Ohio) mixer with paddle:

| Ingredient | % (flour basis) | Weight (Grams) |
|---|---|---|
| Cake flour | 100.00 | 700 |
| Granulated sugar | 105.00 | 735 |
| Shortening | 50.00 | 350 |
| Salt | 3.50 | 25 |
| NFMS | 15.00 | 105 |
| Whole eggs | 10.00 | 70 |
| Water | 50.00 | 350 |
| Vanilla | 3.00 | 21 |
| Baking powder | 0.25 | 1.75 | then 175g. (25% basis flour) of whole eggs and 161g. (23% basis flour) of egg yolk were added to the above and mixed for two minutes after which 245g. (35% basis flour) of water were added and the entire contents were mixed thoroughly for four minutes.

The pound cakes resulting from the aformentioned formulation compared very favorably with those produced from the same ingredients but with a commercial cake shortening (vegetable and animal fats — 3% minimum monoglycerides; WMP range of 116°–122°F., also containing BHA and BHT). Table I shows the results of the conducted comparisons. The terms $S_i$ and $S_c$ refer respectively to the shortening composition according to the invention and the commercial shortening used.

TABLE I

| Shortening | Specific Gravity | Volume cc/lb | Remarks |
|---|---|---|---|
| $S_c$ (Plastic) | 0.72 | 1138 | Uniform grain, satisfactory |
| $S_c$ (Molten) | 1.06 | 780 | Very poor grain, poor volume, unsatisfactory |
| $S_i$ (Plastic) | 0.68 | 1271 | Uniform grain, good texture |
| $S_i$ (Molten) | 0.67 | 1300 | More uniform grain, good texture |

EXAMPLE IV
Preparation of White Layer Cakes 354 grams of a cake flour were placed in a bowl and blended for two minutes with 284 grams of the shortening composition according to the invention. The contents were mixed for an additional 2 minutes followed by scraping the walls of the bowl. The following ingredients:

| Ingredient | Weight (Grams) |
|---|---|
| Granulated sugar | 794 |
| Cake flour | 213 |
| NFMS | 71 |
| Salt | 21 |
| Baking powder | 35.5 |
| Water | 284 | were added slowly to the bowl and the contents mixed for two minutes at medium speed followed by scraping the bowl. Now, 454 grams of egg whites were added slowly and mixed for two minutes. Finally, 227 grams of water were added slowly and the contents were mixed for four minutes.

The baked cakes had excellent properties. When compared with those prepared from $S_c$ described in the prior example the results listed in Table II were observed:

TABLE II

| Shortening | Specific Gravity | Cake Vol. cc/lb | Remarks |
|---|---|---|---|
| $S_c$ (Plastic) | 0.82 | 1025 | Poor volume, uneven grain |
| $S_i$ (Plastic) | 0.76 | 1410 | Good volume, uniform grain |
| $S_c$ (Molten) | 1.05 | 1030 | Poor volume, uniform grain |
| $S_i$ (Molten) | 0.91 | 1362 | Good body, good texture and uniform grain |

EXAMPLE V
Preparation of Yellow Layer Cakes

In a bowl the following ingredients were mixed for two minutes under medium speed:

| Ingredient | % (Basis Flour) | Weight (Grams) |
|---|---|---|
| Cake flour | 100.00 | 750 |
| Granulated sugar | 130.00 | 975 |
| NFMS | 10.00 | 75 |
| Baking powder | 6.00 | 45 |
| Salt | 3.00 | 23 |
| Water | 60.00 | 450 |
| Vanilla | 3.00 | 23 |
| Shortening | 50.00 | 375 |

To the above ingredients 338g. of whole eggs (45% basis flour), 112g. of eggs whites (15%) and 225g. of water (30%) were added in two equal portions. The first portion was mixed with the ingredients for one minute at slow speed and the remainder for three minutes, also at slow speed.

Both the shortening according to the process of the invention ($S_i$) and the commercial grade ($S_c$) tested were utilized with the results listed in Table III.

TABLE III

| Shortening | Specific Gravity | Cake Vol. cc/lb | Remarks |
|---|---|---|---|
| $S_c$ (Plastic) | 0.79 | 1540 | Uniform grain, acceptable quality |
| $S_i$ (Plastic) | 0.70 | 1725 | Good texture and improved uniform grain (better than above) |
| $S_c$ (Molten) | 0.95 | 1025 | Acceptable, poor volume |
| $S_i$ (Molten) | 0.78 | 1500 | Acceptable with good volume |

EXAMPLE VI
Preparation of Buttercream Icings

Buttercream icings having specific gravities in the range 0.65–0.85 were prepared by first dry-blending for two minutes 686g. of 6X powdered sugar, 42.5g. (NFMS) and 3.5g. of salt. To this dry mix was slowly added 198.5g. of shortening and the contents were mixed at low speed for one minute, followed by scraping the bowl and further mixing at medium speed for an additional minute. To the smooth mass was slowly added 117g. of water and the bowl contents were mixed at medium speed for four minutes. If the shortening was in the molten state, cold water (40°F.) was added; in the plastic state the water was at room temperature.

The resulting icing showed excellent quality comparable to those obtained with commercial, normally plastic shortenings formulated specially for this purpose. Again, when the commercial plastic shortenings were used in the molten state, unsatisfactory icings were produced with the usual undesirable qualities of instability, wetness, syneresis and air cell coalescence.

EXAMPLE VII
Preparation of Chilled and/or Aerated Filler Icings

A filler icing composition was prepared in an identical manner to that described in Example I, utilizing the molten shortening of the invention. The icing, however, was further aerated through a scraped surface heat exchanger (Votator Units A, B and C). The icing was shown to have a specific gravity of 0.54 and characterized by having firm body, stability and no air cell coalescence. For comparison, two commercial, normally plastic shortenings suitable for icing were rendered molten and then added to the other ingredients in the same manner as described earlier. The icing obtained were unacceptable, having weak body and air cell coalescence as well as being unstable.

Similar results were obtained when additional mechanical mixing and aeration were provided for the icing emerging out of the scraped surface heat exchange unit. The additional treatment was rendered by an Oakes machine set at rotor speed of 200 RPM, back pressure of 40–60 PSIG and air meter setting at 8–10.

EXAMPLE VIII

The shortening of the present invention can be prepared entirely from vegetable ingredients. The extent of the triglycerides should be in the percentage indicated, i.e., 77 to 94% by weight. Generally the triglyceride fats are formulated to a desirable iodine value (I.V.) by mixing two or more triglycerides of differing iodine values. Generally (I.V.'s) of 50–75 are quite acceptable.

A series of shortening preparations were made from a mixture of hydrogenated palm oil (I.V. 45) and hydrogenated soybean oil (I.V. 103) wherein the proportion of the hydrogenated palm oil ranged from 75–80% of the entire triglyceride content, and the hydrogenated soybean oil ranged from 20–25%. The mixture of the two hydrogenated oils was first blended to provide the requisite solid fat index (SFI) desired and then mixed with the remainder of the shortening composition in the range of 85–90% by weight.

A typical formulation was prepared from the ingredients listed below with the percentages indicated:

| Ingredient | % By Weight |
| --- | --- |
| Hydro. Palm Oil (45 I.V.) | 70.2 |
| Hydro. Soybean Oil (103. I.V.) | 19.5 |
| Monoglycerides & diglycerides | 6.2 |
| Triglycerol monostearate | 2.4 |
| Polyoxyethylene (20) sorbitan monostearate | 0.7 |
| Lecithin | 1.0 |
| | 100.0 |

The formed shortening was maintained molten in a Tank similar to Tank 11 of the drawing, from which the molten all-purpose shortening could be drawn on demand.

For many different recipes of bread and cakes the above shortening was excellent and noticeably superior to prior art liquid shortenings. The advantage was the ability to utilize the same molten shortening for filler icings, as described below.

A filler icing was prepared from the above shortening (in the molten state) utilizing the following ingredients:

| Ingredient | % By Weight |
| --- | --- |
| Syrup (sucrose 67% + 33% boiling water) | 52.0 |
| Corn syrup | 13.0 |
| Non-Fat-Milk Solids (NFMS) | 2.4 |
| Shortening (molten) | 32.0 |
| Flavorant (Vanilla) | 0.3 |
| Salt (NaCl) | 0.3 |
| | 100.0 |

The filler icing of the above formulation was prepared in a 125 pound batch by blending the dry ingredients (NFMS, NaCl) with the two syrups in a portable mixer until a homogeneous mass was obtained. The molten shortening was then introduced into the tank with mixing and agitation. The icing slurry produced was at about 120°F. The warm icing was then passed through a scraped-surface heat exchange unit (Votator) and the emerging votated icing was aerated additionally in an Oakes Continuous Mixer. The specific gravity was measure at 0.60 (lower specific gravities could be obtained if desired; as low as 0.4 was obtained without deleterious results).

The over-all qualities of the above filler icing were excellent. Neither syneresis nor air cell coalescence was noticed or observed. In fact, the icing composition at temperatures ranging between 70° and 85°F. was shown to be completely dry and stable. The 85°F. temperature was a controlled temperature not an ambient temperature.

I claim:

1. In a process for preparing bakery products including breads, cakes, sweet goods, icings, toppings, fillings, and fondants wherein a minor proportion of shortening is blended with a major proportion of other comestible wet and dry ingredients to form a fluent culinary mixture which is subsequently baked or aerated to produce said bakery products, the improvement which comprises:
   1. providing and maintaining in a molten state at a temperature between 120° and 160°F. a shortening composition which is normally plastic at room temperature, and consisting essentially of:
      a. from 77 to 94% by weight, based on the composition of an edible triglyceride fat derived from fatty acids containing 12–22 carbons and characterized by having a Wiley Melting Point between about 90° and 140°F., and the ability to form, on cooling, stable crystalline bodies preponderantly of the beta-prime phase configuration;
      b. from 1.5 to 8% by weight of edible monoglycerides;
      c. from 2 to 8% by weight of edible polyglycerol esters;
      d. from 0.5 to 2% of a member selected from the group consisting of edible ethoxylated sorbitan esters and edible ethoxylated mono-glycerides;
      e. from 0 to 3% by weight of edible diglycerides; and
      f. from 0 to 2% by weight of an edible phospholipid; said monoglycerides and diglycerides, polyglycerol esters, ethoxylated sorbitan esters, and ethoxylated monoglycerides all containing fatty acid components having 16–22 carbons; and
   2. blending a proportion of said molten shortening with substantially all of said other dry and wet ingredients thereby forming said fluent culinary mixture.

2. The process according to claim 1 wherein said fluent culinary mixture is aerated by passage through a scraped surface heat exchange unit.

3. The process according to claim 1 wherein said fluent culinary mixture is aerated by mechanical mixing.

4. The process according to claim 1 wherein said fluent culinary mixture is aerated simultaneously with said blending step.

5. The process according to claim 1 wherein said shortening composition is maintained molten at about 125°F.

6. The process according to claim 1 wherein said edible triglyceride fat is selected from tallow, rearranged lard, hydrogenated cottonseed oil, hydrogenated soybean oil, hydrogenated peanut oil, hydrogenated palm oil, hydrogenated corn oil, hydrogenated safflower oil, hydrogenated sunflower seed oil, hydrogenated rapeseed oil, hydrogenated sesame seed oil and mixtures thereof.

7. The process according to claim 1 wherein the polyglycerol ester of (c) is selected from triglycerol monostearate, diglycerol monostearate and hexaglycerol distearate.

8. The process according to claim 1 wherein said ethoxylated sorbitan esters of (d) have 5–80 ethylene oxide moieties per molecule and said ethoxylated monoglycerides contain ethylene oxide in the range 25 to 80% by weight.

9. The process according to claim 1 wherein the phospholipid of (f) is lecithin.

10. The process according to claim 1 wherein said shortening composition consists essentially of about 88.0% edible triglyceride fat, at least about 2.5% edible monoglycerides, about 4.0% triglycerol monostearate, about 1.5% polyoxyethylene (20) monostearate, about 1.0% lecithin and the remainder edible diglycerides.

* * * * *